(12) United States Patent
Long

(10) Patent No.: US 6,360,042 B1
(45) Date of Patent: Mar. 19, 2002

(54) TUNABLE OPTICAL FIBER GRATINGS DEVICE

(76) Inventor: Pin Long, 199, du Fort-Rémy, LaSalle (CA), H8R 4C5

( * ) Notice: Subject to any disclaimer, the term of this patent is extended or adjusted under 35 U.S.C. 154(b) by 0 days.

(21) Appl. No.: 09/774,057

(22) Filed: Jan. 31, 2001

(51) Int. Cl.[7] .............................. G02B 6/34; H04J 14/02
(52) U.S. Cl. ............................. 385/37; 385/12; 385/13; 385/31; 385/32; 359/130
(58) Field of Search ............................. 385/31, 32, 39, 385/27, 28, 51, 12, 13; 359/130

(56) References Cited

U.S. PATENT DOCUMENTS

| | | | |
|---|---|---|---|
| 5,317,576 A | * 5/1994 | Leonberger et al. | 372/6 |
| 5,469,520 A | * 11/1995 | Morey et al. | 385/37 |
| 5,602,949 A | * 2/1997 | Epworth | 385/37 |
| 5,613,023 A | * 3/1997 | Guillon et al. | 385/37 |
| 5,774,619 A | * 6/1998 | Bruesselbach | 385/37 X |
| 5,787,213 A | * 7/1998 | Brownlow | 385/37 |
| 5,812,711 A | 9/1998 | Glass et al. | 385/37 X |
| 5,841,920 A | * 11/1998 | Lemaire et al. | 385/37 |
| 5,999,671 A | * 12/1999 | Jin et al. | 385/37 |
| 6,031,950 A | * 2/2000 | Fujita | 385/37 |
| 6,055,348 A | * 4/2000 | Jin et al. | 385/37 |
| 6,107,470 A | * 8/2000 | Jin et al. | 385/37 |
| 6,148,128 A | 11/2000 | Jin et al. | 385/37 X |
| 6,154,590 A | * 11/2000 | Jin et al. | 385/37 |
| 6,278,819 B1 | * 8/2001 | Reddy | 385/37 |

OTHER PUBLICATIONS

Ball, G.A. & Morey, W. W., "Compression–Tuned Single–Frequency Bragg Grating Fiber Laser", Dec. 1, 1994, Optics Letters, vol. 19, No. 23.

Benjamin, J.E. et al., "Dual on–fiber thin film heaters for fiber gratings with independently adjustable central wavelength and chirp".

* cited by examiner

*Primary Examiner*—Brian Healy

(57) ABSTRACT

A tunable optical fiber grating device for tuning optical characteristic responses of an optical grating area of an optical fiber includes an elongated beam member defining a neutral plane with a first and a second ends and adapted to receive the fiber therealong. A securing member continuously secures the grating area all along the beam member between its ends and generally parallel to the neutral plane to allow for transmission of a bend of the beam member about the neutral plane to the grating area. A fixed support member has a screw for releasably securing the first end of the beam member within the neutral plane, and a mobile support member has a slotted element to slidably receive the second end of the beam member within the neutral plane. The mobile support member displaces the second end relative to the first end substantially perpendicularly to the neutral plane to bending the beam, thereby stretching or compressing the grating area for tuning the optical characteristic responses of the optical fiber depending on the direction of the bend.

15 Claims, 4 Drawing Sheets

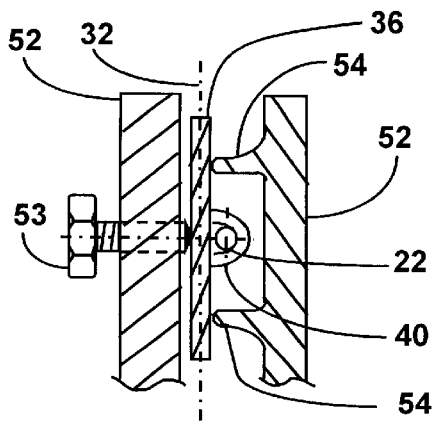 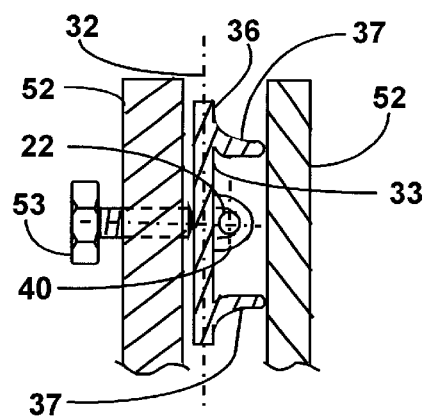
Fig. 7    Fig. 7a
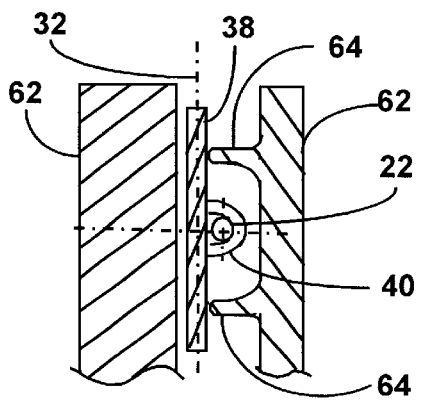 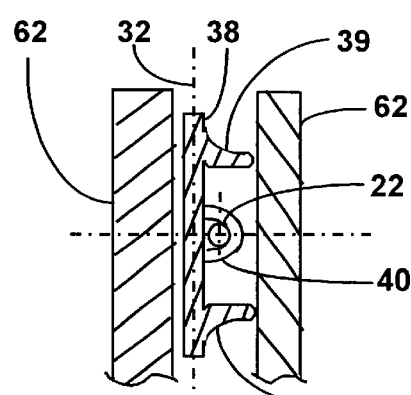
Fig. 8    Fig. 8a
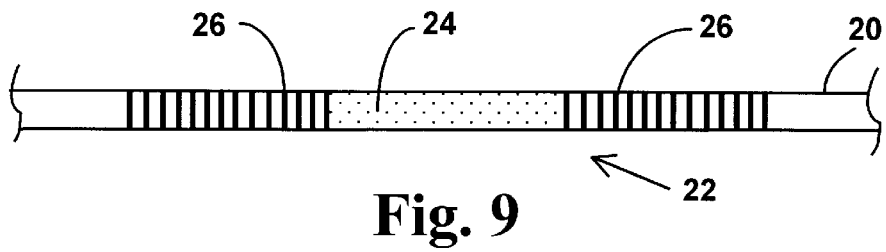
Fig. 9
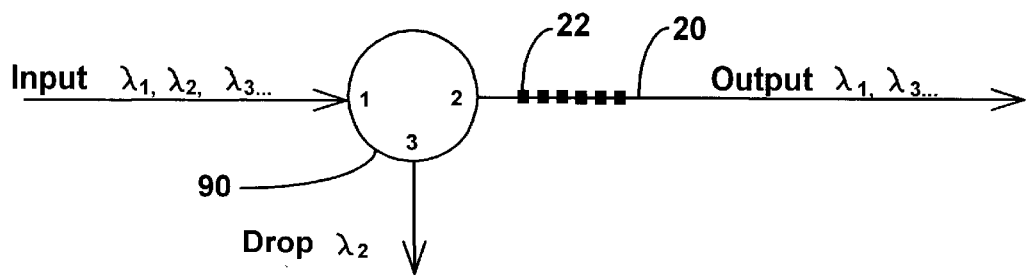
Fig. 10

TUNABLE OPTICAL FIBER GRATINGS DEVICE

FIELD OF THE INVENTION

This invention relates to optical fiber gratings and, in particular, to tunable optical fiber gratings devices.

BACKGROUND OF THE INVENTION

UV light can induce a permanent refractive index change in some kind optical fibers and optical wave-guides. The photosensitivity of the certain kind optical fiber wave-guide can be used to make Bragg gratings and long period gratings, which is a permanent, spatially periodic refractive index modulation along the length of the photosensitive core of the optical fiber or optic wave guide. Fiber Bragg gratings can selectively reflect specific wavelengths of light within an optical fiber. The selective reflected wavelength is equal to the twice the periods of the Bragg grating times the effective refractive index of the propagation mode. Fiber grating have many applications including band rejection filter, semiconductor laser stabilizer, fiber laser wavelength selector, fiber amplifier reflector, fiber dispersion compensation, DWDM (Drop Wavelength Division Multiplex) filter, WDM add and drop multiplex, light pulse shape reforming, optical fiber switch, optical sensor.

There is a demand to alter the periodic spacing of fiber refractive index perturbations in fiber core (or both core and cladding) to have tunable fiber grating whose wavelength can be controllable. The applications like tunable DWDM filter, dynamic DWDM add and drop multiplexer, tunable fiber laser, tunable wavelength selective switch require tunable fiber Bragg gratings. One attempt is to use magnetostrictive strain for tuning the fiber grating (U.S. Pat. No. 5,812,711). The disadvantages of this approach are that the size of large magnetostrictive component is not small and the cost of the device is relatively high.

G.A. Ball and W.W. Morey used compression-tuned approach to tune fiber Bragg gratings over 32 nm ranges (see G. A. Ball and W. W. Morey Optics Letters, Vol. 19, pp. 1979(1994)). This approach needs very precisely grounded ceramic ferrules, and very high accurate alignment and is very expensive.

Benjamin L. Eggleton, John A. Rogers, Paul S. Westbrook and Thomas A. Strasser from Bell Lab, Lucent Technologies Inc. coated fibers with two metal layers, one uniform metal layer and one variable thickness metal layer along the fiber grating, to tune the fiber grating center wavelength and chirp independently. It is very complicated and costly to coat fiber with two different metal layers.

OBJECTS OF THE INVENTION

An object of the present invention is to provide a tunable optical fiber gratings device that obviates the above-mentioned disadvantages.

Another object of the present invention is to provide a tunable optical fiber gratings device with a simple tuning mechanism.

A further object of the present invention is to provide a tunable optical fiber gratings device, which allowed having a wide tuning range with high accuracy.

Still another object of the present invention is to provide a tunable optical fiber gratings device having a low cost.

Other objects and advantages of the present invention will become apparent from a careful reading of the detailed description provided herein, with appropriate reference to the accompanying drawings.

SUMMARY OF THE INVENTION

According to the present invention, there is provided a tunable optical fiber gratings device for tuning optical characteristic responses of a longitudinal optical grating area of an optical fiber, the device comprises an elongated beam member defining a neutral plane with a first and a second ends and adapted to receive the fiber therealong, a securing member for continuously securing the optical grating area all along the beam member between the first and second ends and generally parallel to the neutral plane to allow for transmission of a bend of the beam member about the neutral plane to the optical grating area, a fixed support member having a clamping means for releasably securing the first end of the beam member within the neutral plane, and a mobile support member having a directing means for slidably receiving the second end of the beam member within the neutral plane. The mobile support member displaced the second end relative to the first end substantially perpendicularly to the neutral plane and bending the same, thereby stretching or compressing the grating area of the fiber for tuning the optical characteristic responses of the optical fiber depending on a direction of the bend.

Preferably, the optical fiber is a combination of at least one doped fiber zone and at least one fiber grating zone which being adjacent to each other.

Preferably, the beam member has a uniform cross-section perpendicular to the neutral plane between the first and second ends. The beam member preferably has a generally polygonal shape within the neutral plane for providing a non chirped tuning of the fiber.

Preferably, the beam member has at least one guiding member extending between the first and second ends and adapted for guiding the optical grating area of the fiber therealong.

Preferably, the first end of the beam member has at least one abutment member adjacent to the securing member and the fiber is in abutting position with the clamping means for preventing the optical grating area and the securing member from being strained by the clamping means.

Preferably, the second end of the beam member has at least one abutment member adjacent to the securing member and the fiber is in abutting position with the directing means for preventing the optical grating area and the securing member from being strained by the directing means.

Alternatively, the clamping means has at least one abutment member being in abutting position with the first end of the beam member adjacent to the securing member for preventing the optical grating area and the securing member from being strained by the clamping means. Also, the directing means has at least one abutment member being in abutting position with the second end of the beam member adjacent to the securing member for preventing the optical grating area and the securing member from being strained by the directing means.

Preferably, the device further comprises a driving mechanism connected to the mobile support member for displacing the second end relative to the first end of the beam member substantially perpendicularly to the neutral plane via the directing means mounted on the mobile support member.

Preferably, the mobile support member includes a sliding gauge for measuring displacement of the second end of the beam member relative to the first end.

Preferably, the device further comprises a controller connected to the driving mechanism for controlling the bend of the beam member, thereby controlling the optical characteristic responses of the grating area of the optical fiber.

Preferably, the fiber is a first fiber located at a first determined distance from the neutral plane. Preferably, the beam member adapted to receive a second longitudinal optical grating area of a second optical fiber therealong. Preferably, the device further comprises a second securing member for continuously securing the second grating area all along the beam member between the first and second ends and generally parallel to the neutral plane at a second distance from the same.

Preferably, the second fiber secured on an opposite side of the neutral plane relative to the first fiber.

Preferably the first and second distances are approximately equal.

BRIEF DESCRIPTION OF THE DRAWINGS

In the annexed drawings, like reference characters indicate like elements throughout.

FIG. 7 is an enlarged section view taken along line 7—7 of FIG. 1, showing the clamping means of the fixed support member with an abutment member;

FIG. 7a is a view similar to FIG. 7 showing another embodiment of the first end of the beam member with an abutment member;

FIG. 8 is an enlarged section view taken along line 8—8 of FIG. 1, showing the directing means of the mobile support member with an abutment member;

FIG. 8a is a view similar to FIG. 8 showing another embodiment of the second end of the beam member with an abutment member;

FIG. 9 is a schematic illustration of a tunable optical fiber grating area with two tunable fiber grating zones separated by a doped zone; and FIG. 10 is a schematic illustration of a tunable optical fiber grating device with a circulator to drop one wavelength from the signal transmitted.

DETAILED DESCRIPTION OF THE PREFERRED EMBODIMENTS

With reference to the annexed drawings the preferred embodiment of the present invention will be herein described for indicative purposes and by no means as of limitation.

Figure 1:
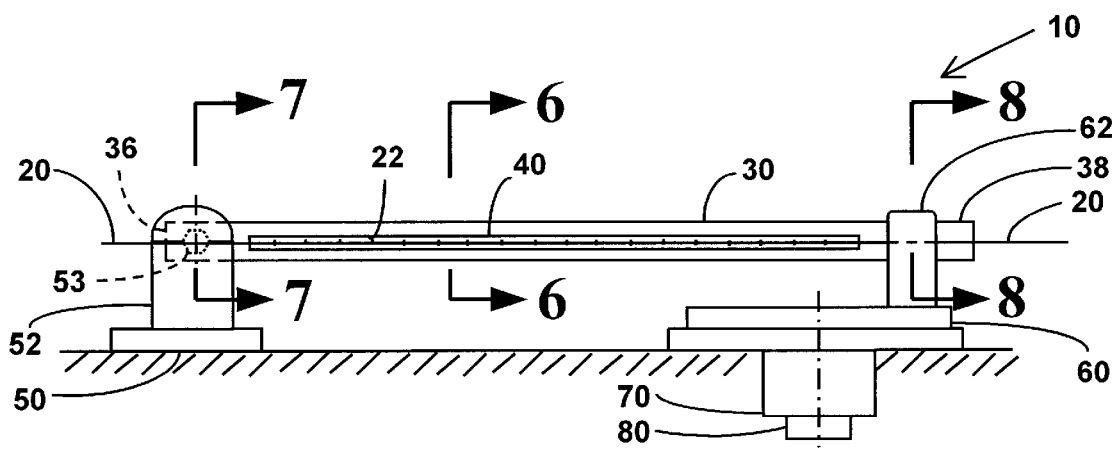
FIG. 1 is a side view of an embodiment of a tunable optical fiber gratings device according to the present invention, showing the optical grating area of the fiber in normal relieved configuration.
Figure 2:
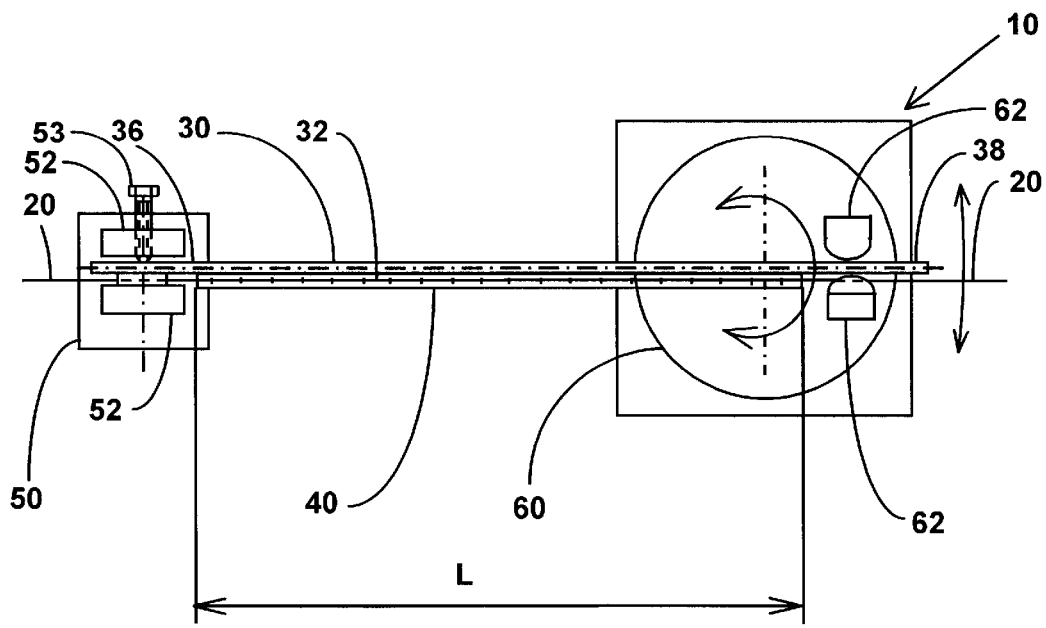
FIG. 2 is a top view of the embodiment of FIG. 1.
Figure 3:
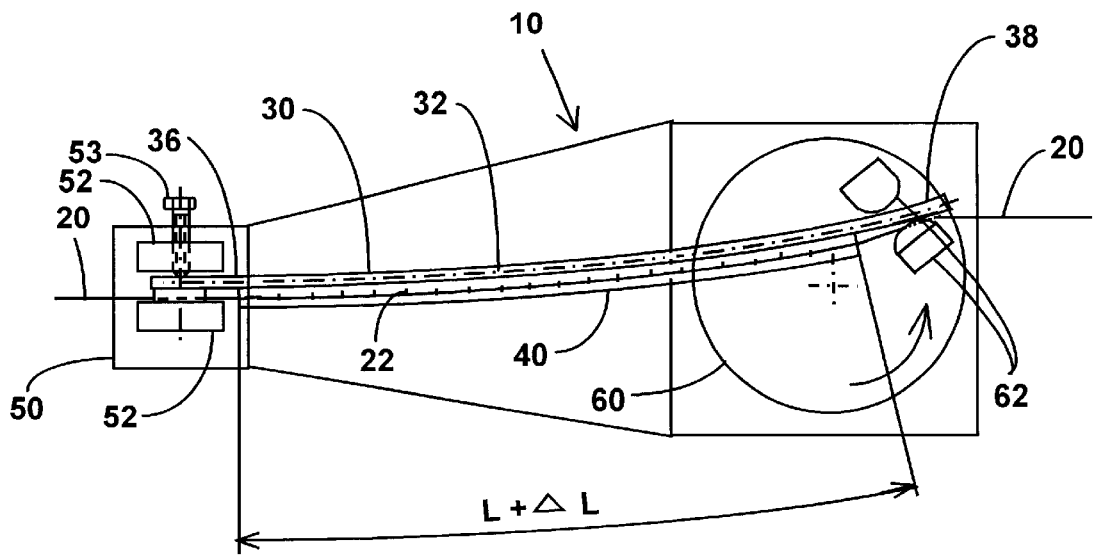
FIGS. 3 and 4 are top views of the embodiment of FIG. 1, showing the optical grating area of the fiber in stretch and compressed configurations respectively.
Figure 4:
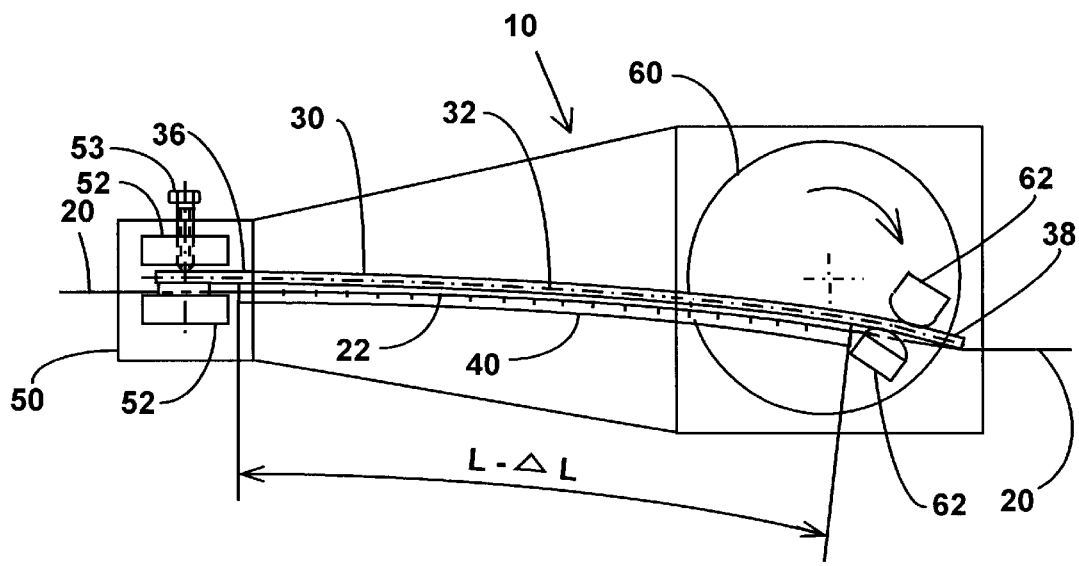

Referring to FIGS. 1 and 2, there is shown an embodiment 10 of a tunable optical fiber grating device in accordance with the present invention for tuning an optical characteristic response of a longitudinal optical grating area 22 of an optical fiber 20. The device 10 includes an elongated beam member 30 defining a substantially vertical neutral plane 32 (as commonly defined in structural analysis) with a first end 36 and a second end 38 and adapted to receive the fiber 20 therealong. A securing member 40 is used for continuously securing the optical grating area 22 all along the beam member 30 between the first 36 and second 38 ends and generally parallel to the neutral plane 32 to allow for transmission of a bend of the beam member 30 about the neutral plane 32 to the optical grating area 22. A fixed support member 50 has a clamping means 52, preferably a tightening screw 53, for releasably securing the first end 36 of the beam member 30 within the neutral plane 32. A mobile support member 60 has a directing means, preferably a slotted element 62, for slidably receive the second end 38 of the beam member 30 within the neutral plane 32. When the mobile support member 60 rotates about its vertical axis, it displaces the second end 38 of the beam member 30 relative to the first end 36 substantially perpendicularly to the neutral plane 32 to bend the beam member 30 being a cantilever beam. This allows for stretching or compressing the grating area 22 of the fiber 20 for tuning the optical characteristic response of the optical fiber 20 depending on a direction of that bend, as shown in FIGS. 3 and 4 respectively.

The securing member 40 is preferably a glue or epoxy type of material as well as metal welding of a metallic elongated tube perfectly receiving the fiber 20 to the beam member 30 or any other means that can transmit a bend about neutral plane 32 from the beam member 30 to the optical grating area 22, without sliding motion of one relative to the other along the length of the beam member 30.

Accordingly, the epoxy 40 can be either continuously spread all along the grating area 22 or provide a plurality of securing points all along the same, as long as there is no buckling of the fiber between two adjacent points under compression.

As shown in FIG. 2, the total length L of the grating area 22 longitudinally secured on the elongated beam member 30 is fixed. Slight changes of the length L lead to changes of the center wavelength of the fiber grating area 22. In the stretched configuration, the grating area 22 gets elongated to L+$\Delta$L as indicated in FIG. 3. In the compressed configuration, the grating area 22 gets shortened to L−$\Delta$L as indicated in FIG. 4. These changes of the length L of the grating area 22 enable a fine turning resolution of the tunable optical fiber grating device 10. The capability of both compressing and stretching the fiber grating area 22 allows for a wide tuning range.

The beam member 30 preferably has a uniform cross-section perpendicular to the neutral plane 32 between the first and second ends, but this makes the local bending angle continuously increasing from the first end 36 to the second 38, affecting the tuning of the fiber 20.

Figure 5:
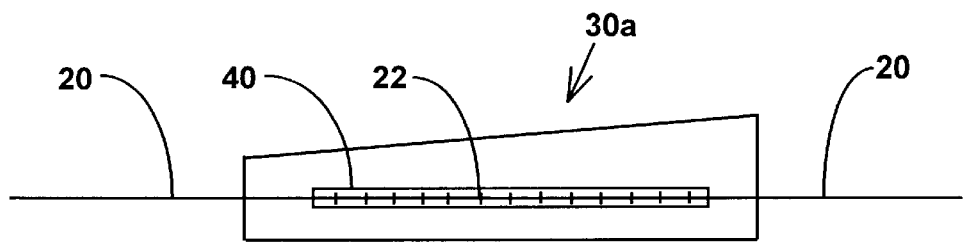
FIGS. 5, 5a and 5b are partial side views of other embodiments of the beam member, showing the beam member being of a linear, concave and convex trapezoidal shape respectively.
Figure 5A:
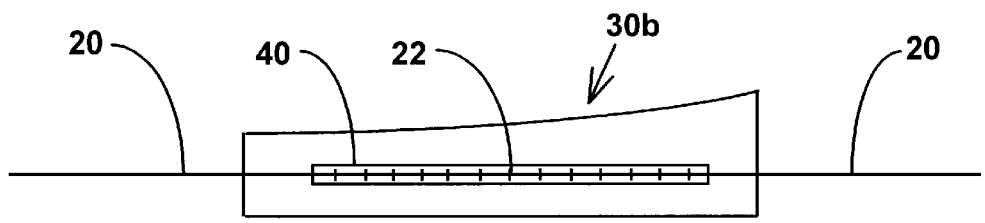
Figure 5B:
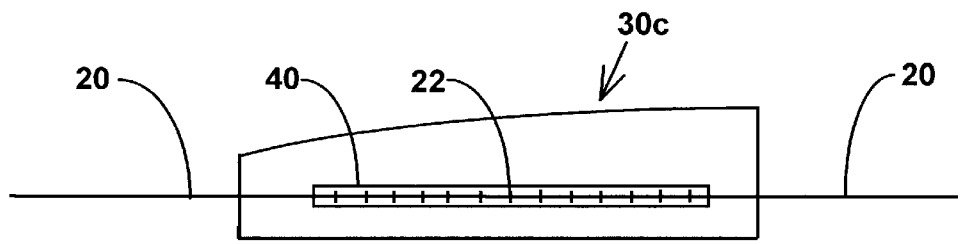

Consequently, as shown in FIGS. 5, 5a and 5b, the beam member 30 can have different polygonal shape within the neutral plane 32 such as a linear, concave or convex shape respectively, to play with this local bending angle and consequently the optical characteristics of the fiber 20. Providing a constant bending angle along the grating area 22 enables a linear shift of the center wavelength without changing the bandwidth tuning (no chirped tuning). At the opposite, it is possible to vary the bandwidth tuning without varying the center wavelength.

Figures 6, 6A, 6B:
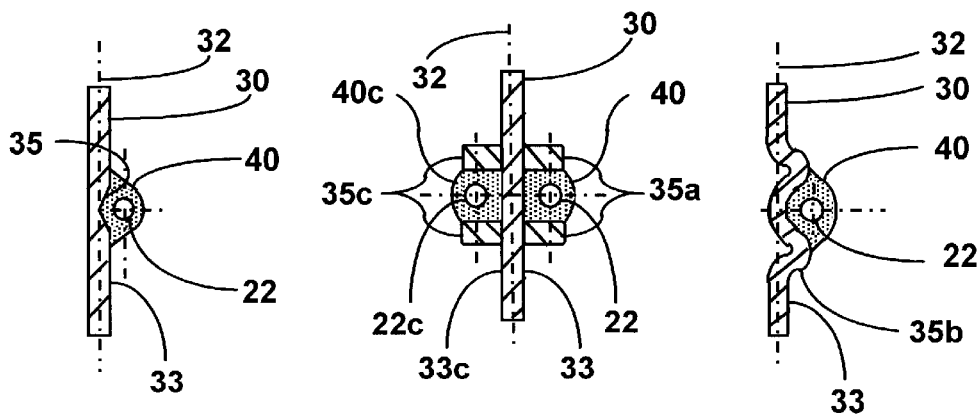
FIG. 6 is an enlarged section view taken along line 6—6 of FIG. 1, showing the guiding member for guiding the fiber along the beam member.
FIGS. 6a and 6b are views similar to FIG. 6 showing different embodiments of the guiding member, FIG. 6a further showing a second fiber secured to the same beam member.

As shown in FIG. 6, the beam member 30 has at least one guiding member, preferably in the form of a groove 35 extending between the first and second ends adapted for guiding the optical grating area 22 of the fiber 20 therealong. As illustrated in FIGS. 6a and 6b, the guiding member is of the form of guiding bars 35a or curved forming 35b of the beam member 30 respectively.

As shown in FIG. 7, the clamping means 52 has at least one abutment member 54 to be in abutting position with the first end 36 of the beam member 30 adjacent to the securing member 40 for preventing the optical grating area 22 and the securing member 40 from being strained by the tightening screw 53.

Similarly, as illustrated in FIG. 8, the directing means 62 has at least one abutment member 64 to be in abutting position with the second end 38 of the beam member 30 adjacent to the securing member 40 for preventing the optical grating area 22 and the securing member 40 from being strained by the slotted element 62.

Referring to FIG. 7a, the first end 36 of the beam member 30 could have at least one abutment member 37 adjacent to the securing member 40 and the fiber 20 to be in abutting position with the clamping means 52 for preventing the optical grating area 22 and the securing member 40 from be strained by the tightening screw 53.

Similarly, as shown in FIG. 8a, the second end 38 of the beam member 30 has at least one abutment member 39 adjacent to the securing member 40 and the fiber to be in abutting position with the directing means 62 for preventing the optical grating area 22 and the securing member 40 from being strained by the slotted element 62.

Referring to FIG. 1, the device 10 further comprises a driving mechanism 70 connected to the mobile support member 60 for rotating the same around its vertical axis and displacing the second end 38 relative to the first end 36 of the beam member 30 substantially perpendicularly to the neutral plane 30 via the slotted element 62 mounted on the mobile support member 60. Preferably, the mobile support member 60 includes a sliding gauge (non shown) for measuring displacement of the second end 38 of the beam member 30 relative to the first end 36.

Preferably, the device 10 further comprises a controller 80 connected to the driving mechanism 70 for controlling the bend of the beam member 30, thereby controlling the optical characteristic of the grating area 22 of the optical fiber 20.

Referring to FIGS. 9 and 10, the grating area 22 of the optical fiber 20 can be a combination of at least one doped fiber zone 24 and at least one fiber grating zone 26. These zones are preferably adjacent to each other. An optical grating zone 26 can also be a Bragg gratings, long period gratings, tilted Bragg gratings or any other gratings, or different combinations of the latter. For example, the optical fiber grating area 22 can be a combination of an Erbium (Er). or other doped fiber 24 zone between two fiber grating zones 26, as shown in FIG. 9. Referring to FIG. 10, many other applications are possible such as combining a three-port circulator 90 with a tunable optical fiber grating device 10 provides a tunable WDM (Wavelength Division Multiplex) drop multiplexer/demultiplexer, or other laser applications.

Optionally, the device 10 could have more than one optical fiber 20 continuously secured to the beam member 30. The additional fibers could be on the same side 33 of the beam member 30 and its central axis 32, at different distances from the same. Alternatively, tunable grating area 22c of additional fibers could also be secured with epoxy 40c to the opposite side 33a of the beam member 30 relative to the first fiber grating area 22, along the guiding bars 35c, as shown in FIG. 6a. Preferably the first and second distances of the two respective fiber gratings areas to the neutral plane 32 are approximately equal to each other.

High tuning resolution of the tunable optical fiber gratings device 10 can be obtained with a driving mechanism 70 that can be turned with very small steps of 0.001 degree, such as a stepper motor.

This very simple structure of the tunable optical fiber gratings device 10 is of low cost and highly accurate over a wide tuning range.

As it would be obvious to anyone of ordinary skill in the art, a double action linear actuator (not shown) could be used to linearly displace the slotted element 62 to bend the second end 38 of the beam member 30 perpendicularly to the neutral plane 32, instead of a motor rotating the mobile support 60.

Although the present tunable optical fiber gratings device has been described with a certain degree of particularity it is to be understood that the disclosure has been made by way of example only and that the present invention is not limited to the features of the embodiments described and illustrate herein, but includes all variations and modifications within the scope and spirit of the invention as hereinafter claimed.

I claim:

1. A tunable optical fiber gratings device for tuning optical characteristic responses of a longitudinal optical grating area of an optical fiber, said device comprising an elongated beam member defining a neutral plane with a first and a second ends and adapted to receive said fiber therealong, a securing member for continuously securing said optical grating area all along said beam member between said first and second ends and generally parallel to said neutral plane to allow for transmission of a bend of said beam member about said neutral plane to said optical grating area, a fixed support member having a clamping means for releasably securing said first end of said beam member within said neutral plane, and a mobile support member having a directing means for slidably receiving said second end of said beam member within said neutral plane, said mobile support member displacing said second end relative to said first end substantially perpendicularly to said neutral plane and bending the same, thereby stretching or compressing said grating area of said fiber for tuning said optical characteristic responses of said optical fiber depending on a direction of said bend.

2. A device as defined in claim 1, wherein said grating area of said optical fiber being a combination of at least one doped fiber zone and at least one fiber grating zone, said zones being adjacent to each other.

3. A device as defined in claim 1, wherein said beam member preferably having a uniform cross-section perpendicular to said neutral plane between said first and second ends.

4. A device as defined in claim 1, wherein said beam member having a generally polygonal shape within said neutral plane for providing a non chirped tuning of said fiber.

5. A device as defined in claim 1, wherein said beam member having at least one guiding member extending between said first and second ends and adapted for guiding said optical grating area of said fiber therealong.

6. A device as defined in claim 1, wherein said first end of said beam member having at least one abutment member adjacent to said securing member and said fiber to be in abutting position with said clamping means for preventing said optical grating area and said securing member from being strained by said clamping means.

7. A device as defined in claim 6, wherein said second end of said beam member having at least one abutment member adjacent to said securing member and said fiber to be in abutting position with said directing means for preventing said optical grating area and said securing member from being strained by said directing means.

8. A device as defined in claim 1, wherein said clamping means having at least one abutment member to be in abutting position with said first end of said beam member adjacent to said securing member for preventing said optical grating area and said securing member from being strained by said clamping means.

9. A device as defined in claim 8, wherein said directing means having at least one abutment member to be in abutting position with said second end of said beam member adjacent to said securing member for preventing said optical grating area and said securing member from being strained by said directing means.

10. A device as defined in claim 1, further comprising a driving mechanism connected to said mobile support member for displacing said second end relative to said first end of said beam member substantially perpendicularly to said neutral plane via said directing means mounted on said mobile support member.

11. A device as defined in claim 10, wherein said mobile support member including a sliding gauge for measuring displacement of said second end of said beam member relative to said first end.

12. A device as defined in claim 10, further comprising a controller connected to said driving mechanism for controlling said bend of said beam member, thereby controlling of said optical characteristic responses of said grating area of said optical fiber.

13. A device as defined in claim 1, wherein said fiber being a first fiber located at a first determined distance from said neutral plane, said beam member being adapted to receive a second longitudinal optical grating area of a second optical fiber therealong, said device further comprising a second securing member for continuously securing said second grating area all along said beam member between said first and second ends and generally parallel to said neutral plane at a second distance from the same.

14. A device as defined in claim 13, wherein said second fiber being secured on an opposite side of said neutral plane relative to said first fiber.

15. A device as defined in claim 14, wherein said first and second distances are approximately equal.

* * * * *